United States Patent [19]

Spillman, Jr. et al.

[11] Patent Number: 4,874,245
[45] Date of Patent: Oct. 17, 1989

[54] OPTICAL SHAFT ANGULAR AND TORSIONAL DISPLACEMENT AND SPEED SENSING SYSTEM

[75] Inventors: William B. Spillman, Jr., Charlotte; Robert E. Rudd, III, Middlebury; Sylvester M. Ellinger, North Ferrisburg; Douglas R. Patriquin, Middlebury; Bruce R. Kline, Starksboro, all of Vt.

[73] Assignee: Simmonds Precision Products, Inc., Wilmington, Del.

[21] Appl. No.: 201,800

[22] Filed: Jun. 3, 1988

Related U.S. Application Data

[63] Continuation-in-part of Ser. No. 162,794, Feb. 26, 1988.

[51] Int. Cl.$^4$ .............................................. G01B 11/26
[52] U.S. Cl. .................................... 356/364; 250/225
[58] Field of Search ........................ 356/364, 365, 338; 250/225

[56] References Cited

U.S. PATENT DOCUMENTS 2,313,923  3/1943  Chubb .
3,474,255  10/1969  White .
3,584,959  6/1971  Del Carlo et al. ............. 356/365 X
3,604,811  9/1971  McMenamin .
3,938,890  2/1976  Flavell .

Primary Examiner—Davis L. Willis
Assistant Examiner—Matthew W. Koren
Attorney, Agent, or Firm—Dale R. Lovercheck

[57] ABSTRACT

A displacement detector provides a light beam which impinges on an article with different combinations of light altering materials such as reflecting and non-reflecting surfaces, wave retarding plates, and linear polarizers attached to the article to determine angular position, relative angular displacement, and speed of rotatably mounted articles. These beam altering materials change either the polarization state or the magnitude of the light in a predictable manner. When used on different ends of a rotating shaft, the shaft speed and torsional displacement of the front shaft end with respect to the rear shaft end can be determined. When used with an article such as a rotatably mounted throttle, the angular displacement of the throttle can be determined.

17 Claims, 8 Drawing Sheets

OPTICAL SHAFT ANGULAR AND TORSIONAL DISPLACEMENT AND SPEED SENSING SYSTEM

CROSS REFERENCE TO RELATED APPLICATION

This application is a continuation-in-part of co-pending and commonly assigned U.S. patent application Ser. No. 07/162,794 filed February 26, 1988 and entitled "Optical Shaft Torsional Displacement and Speed Sensing System".

BACKGROUND OF THE INVENTION

The present invention relates to apparatus for sensing the angular displacement, the torsional displacement and speed of rotation of a shaft or other object and, more particularly, to sensing the angular and/or torsional displacement of a shaft under torque loading as an indication of the applied torque, position and the speed of rotation of the shaft.

Various devices and methods are known for quantitatively determining the angular and torsional displacement, or twist, of a shaft under load as an indication of the applied torque. When torque is applied to a non-rotating shaft, the torsional displacement can be simply measured as a function of the relative angular displacement, or twist, of one end of the shaft relative to the other. The measurement of angular and torsional displacement is more complicated in dynamic situations where the shaft is rotating at relatively high speeds. Dynamic situations requiring calculation of the torsional displacement include, for example, turbo-machines, such as aircraft gas turbines and other turbo-shaft engines. In these devices, a compressor is located at the forward end of the engine and is connected through a main shaft to a turbine at the rear end of the engine. The torsional displacement of the main shaft is sensed as an incident to measuring engine torque, and the quantitative result is then available as an indication of engine power.

In traditional torque sensing systems for shafts, magnetic sensors are positioned at opposite ends of the engine main shaft and respond to respective toothed wheels secured to the shaft with each sensor providing an electrical pulse output at a pulse repetition rate that varies with the speed of rotation of the shaft. As the shaft is subjected to varying levels of torque, one end of the shaft is torsionally displaced, or twisted, relative to the other end. This causes a change in the phase relationship between the pulse trains from the magnetic sensors. Evaluation of the change in the phase relationship between the pulse trains allows an accurate determination of applied torque and the pulse repetition rate also allows an accurate determination of shaft speed.

In turbo-shaft engine applications, main shaft deflection and speed are determine by a monopole torque sensor of the type disclosed in commonly assigned Eichenlaub U.S. Pat. No. 4,602,515 and Parkinson U.S. Pat. No. 4,488,443. In the disclosed structure, two toothed wheels are positioned adjacent one another on the engine shaft with one of the wheels secured to the shaft and the other of the wheels secured to the end of a hollow reference sleeve. The opposite end of the reference sleeve is connected to the shaft so that torsional twisting of the shaft will cause a relative rotational displacement between the two wheels. A single magnetic pick-up provides an output signal representative of the relative position of the wheels.

While magnetic sensing systems have been developed to a relatively reliable state, they represent a comparatively expensive instrumentation system. Since the sensing system operates in temperature ranges that vary from ambient temperature at engine start-up to 1500° F. or more, the sensors must be designed with heat-resistant materials, and the electrical response characteristics as a function of temperature must be known to provide an accurate output for all operating temperatures. Additionally, magnetic sensing systems are susceptible to electro-magnetic interference (EMI) which can interfere with the correct output of the sensors. While EMI can be reduced with shielding, this solution adds considerable weight to the system and is particularly disadvantageous in airborne applications.

In common with the above torsion and speed sensing apparatus, devices for determining the angular displacement of a rotatably mounted shaft as an incident to the torsional, speed, and angular position, are known as shown, for example, in Emmaninegal U.S. Pat. No. 3,602,719 which discloses an apparatus for measuring the angular position of an object relative to a radiation source. A plane-parallel glass plate is mounted for rotation along an axis parallel to the incident radiation. As the glass plate rotates, the incident radiation beam is refracted in proportion to the angle at which it strikes the glass plate to provide an indication of the angular position of the glass plate and an object to which it is attached.

As can be appreciated from the above, various arrangements have addressed the need to determine angular position, torsional displacement, and speed in the context of a rotatably mounted object, such as a shaft, although such arrangements have not fully utilized optical techniques to provide a lightweight and cost effective system.

SUMMARY OF THE INVENTION

In view of the above, it is an object of the present invention, among others, to provide a system for sensing the torsional displacement of a shaft under dynamic loading that is more efficient, simpler, and less expensive than prior systems.

It is another object of the present invention to provide a system for sensing the torsional displacement of a shaft under dynamic conditions as an incident to measuring the applied torque.

It is still another object of the present invention to provide a system for sensing both torsional displacement of a shaft under dynamic loading as well as shaft rotation speed.

It is a further object of the present invention to provide a system for measuring the torsional displacement of a shaft that operates through a wide temperature range and is relatively immune to electromagnetic interference.

It is a further object of the present invention to provide a system for measuring the angular displacement of an article, such as a shaft mounted controller or the like.

In view of these objects, and others, the present invention provides, in one form, for a retardation plate mounted to an axial face of the shaft and irradiated by polarized light. Angular position, torsional deflection, applied torque, and rotation speed are determined, in part, by the changes in the retardation of the linearly polarized light, i.e., the zero degree polarization component and the 90 degree polarization component, as a function of torsional displacement of the shaft.

In one embodiment of the invention, a quarter-wave retardation plate and underlying mirror are mounted to an axially aligned interior end wall of a hollow shaft. An optical source, such as a light emitting or laser diode, and cooperating polarizer provide linearly polarized light that is directed to the retardation plate and mirror to irradiate the fast axis of the quarter-wave retardation plate at a predefined angle $\theta$ under no-load conditions. The light reflected from the mirror, having made two passes through the quarter-wave retardation plate, is accordingly retarded, i.e., the light includes both a zero degree and a 90 degree polarization component compared to the initial, linearly polarized light. When torsional displacement occurs under load conditions, the angle $\theta$ of the linearly polarized light beam irradiates the quarter-wave retardation plate changes and the magnitude of the polarization components of the retarded light beam also change. Comparison and use of the magnitudes of the no-load polarization components, viz., the zero degree and the 90 degree polarization component, with the polarization component values under load conditions allows calculation of the torsional displacement and shaft rotation speed.

In another embodiment of the present invention, a first axially aligned end wall of the shaft is provided with alternating reflective and non-reflective areas and is irradiated by polarized light to produce reflected light pulses. A polarizer is mounted to an axially aligned interior end wall of the shaft at an end opposite the first end and is irradiated by polarized light directed along the center of the shaft. Torsional displacement of the shaft under load conditions produces reflected light pulses when the transmission axis of the various polarizers are parallel. Comparison of the periods between pulses obtained from the front shaft end with the rear shaft end allows the calculation of both the shaft speed and torsional displacement.

In still another embodiment of the present invention, a retardation plate is attached to an article for which angular position information is required. The retardation plate is mounted so that it is rotatable about its fast axis and is positioned between two stationary linear polarizers that have their transmission axis at a 45° angle to the fast axis of the retardation plate. Broadband light is irradiated through the first polarizer, the retardation plate, and the second polarizer, and is then detected. The angle at which the polarized light strikes the rotatable retardation plate affects the wavelength of the light that is affected most by the slow axis of the retardation plate. Comparison of the wavelength having minimum intensity that passes through the second polarizer allows the calculation of the angular displacement of the retardation plate and its attached object.

The present invention advantageously provides a system for measuring angular displacement of an article or the torsional displacement and speed of rotation of a shaft using lightweight optical components compared to prior systems.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
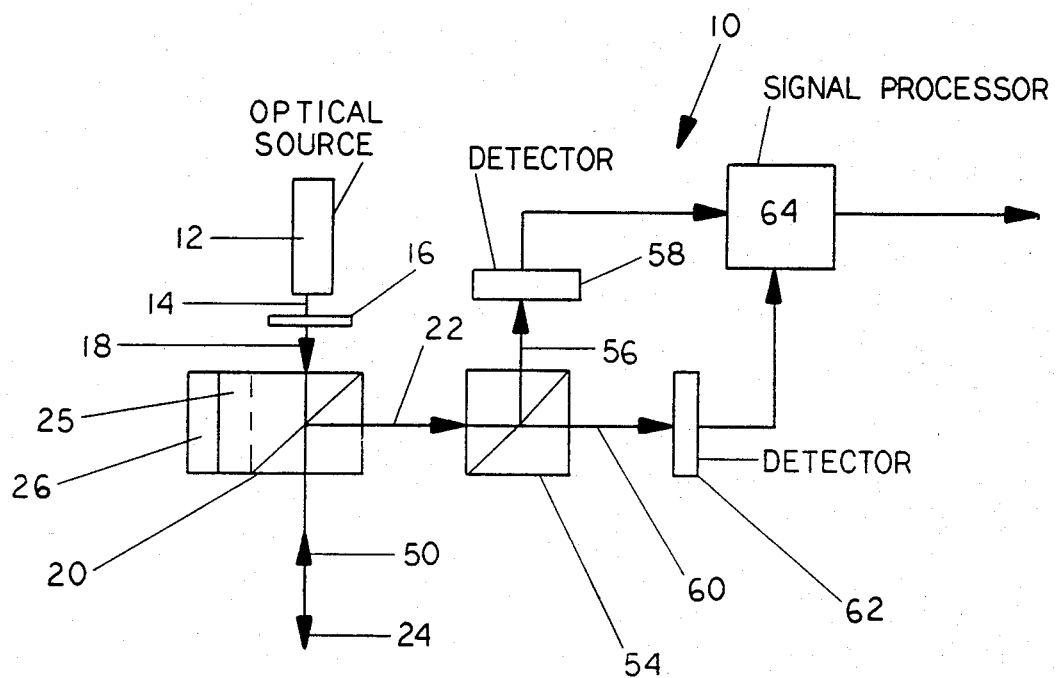
FIG. 1 illustrates the first embodiment of the present invention.
Figure 1:
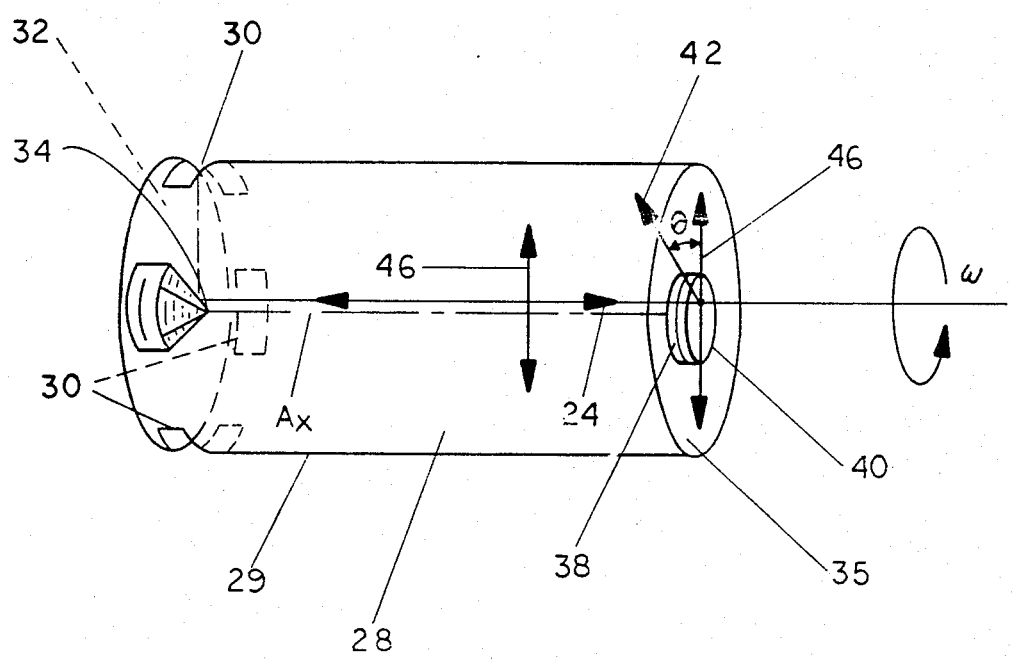

As shown in FIG. 1, a preferred embodiment of a shaft torsional deflection and speed sensing system in accordance with the present invention is designated generally by the reference character 10. The system 10 is designed to measure the torsional deflection and rotation speed w of a shaft 28 mounted for rotation about a longitudinal axis $A_x$. The shaft 28 is defined as a hollow cylinder about the axis $A_x$ and includes end walls 32 and 35 at the forward and rearward ends, respectively, of the shaft 28. In the various figures, the shaft 28 of portions thereof has been shown in phantom outline to reveal interior components. The cylindrical wall surface 29 of the shaft 28 is provided with four equi-spaced windows 30 into which light is introduced and from which light exits to provide the desired torsional deflection and rotational speed information w as discussed more fully below.

A pyramidal-shaped, four-fold mirror 34 is secured to the forward end wall 32 along the axis of rotation $A_x$ so that light entering from the windows 30 along a path 24 will be reflected by the corresponding inclined reflecting surface of the mirror 34 in the general direction of the axis $A_x$ toward the rear end wall 35 of the shaft 28. A flat reflector, preferably in the form of a mirror 40, is secured to the rear end wall 35 with a quarter-wave retardation plate 38 secured to and overlying the surface of the mirror 34. The four-fold mirror 34 and the quarter-wave retardation plate 38 and its mirror 40 are aligned along the axis $A_x$ so that light directed along the path 24 through one of the windows 30 will be reflected by the four-fold mirror 34 in the direction of and through the quarter-wave retardation plate 38. Similarly, the light reflected by the mirror 40 will be directed through the quarter-wave retardation plate 38 to the four-fold mirror 34 for reflection through the window 30 along the light path 50.

Light is introduced into the shaft 28 by an optical circuit which includes an optical source 12, such as a laser diode, that directs light along a path 14 through a linear polarizer 16. The light is preferably monochromatic and in the 800 nm to 1500 nm wavelength range. In an aircraft engine application, a wavelength of 800 nm is preferred, since condensate materials, known as 'coke', that accumulate on surfaces within the engine are acceptably transmissive to 800 nm energy. The linearly polarized light is directed to and enters a beam splitter 20 with a portion of the incident light transmitted through the beam splitter 20 along the light path 24 to the windows 30 of the shaft 28, another portion reflected along a path 22 to a polarizing beam splitter 54, and another portion reflected to a diffuser 25 and a reflector in the form of a mirror 26.

The linearly polarized light that is transmitted through the beam splitter 20 along the light path 24 passes through the windows 30 of the rotating shaft 28 at an angle that is perpendicular to the axis $A_x$ of the shaft 28. The light transmitted along light path 24 passes through one of the windows 30 and strikes one of the four reflecting surfaces of the four-fold mirror 34. The light is reflected at a right angle relative to the light path 24 and is directed toward the surface of the quarter-wave retardation plate 38 at the other end of the shaft 28. In FIG. 1, the direction of polarization of the light travelling along the axis $A_x$ is represented by the vibration direction 46.

The quarter-wave retardation plate 38 is mounted to the rear end wall 35 of the shaft 28 so that its fast axis, represented at 42, is at some predetermined angle $\theta$, when the shaft 28 is under no torsional load and in its torsionally undeflected state, with respect to the vibration direction 46 of the light after passing through one of the windows 30 and reflection by the four-fold mirror 34, that is, any angle except 0°, 90°, 180° or 270°. The incident light from the four-fold mirror 34 enters and passes through the quarter-wave retardation plate 38 and is reflected by the mirror 40 to again pass through the quarter-wave retardation plate 38 toward the four-fold mirror 34. The orientation of the quarter-wave retardation plate 38 provides reflected light from the quarter-wave retardation plate 38 that is retarded relative the incident light from the four-fold mirror 34. For example, where the incident light provided along light path 24 has a 0° polarization component only, the reflected and retarded light from the quarter-wave retardation plate 38 will have both a 0° polarization component and a 90° polarization component because of the retardation effect of the quarter-wave retardation plate 38.

In the case where the incident light provided along the light path 24 is linearly polarized and has a vibration direction 46 with only a 0° polarization component when it first enters the quarter-wave retardation plate 38, and, depending upon the initial angle $\theta$ between the vibration direction 46 and the fast axis 42 when the incident light from light path 24 strikes the quarter-wave retardation plate 38, the reflected and retarded light returned along light path 50 will be linearly polarized and have a 0° polarization component and a 90° polarization component having magnitudes that are a function of the angle $\theta$.

For example, if the angle $\theta$ between the vibration direction 46 of the incident light from the four-fold mirror 34 and the fast axis 42 is equal to 45°, the linearly polarized and retarded light reflected along the light path 50 toward the four-fold mirror 38 will have equal 0° and 90° polarization components. The 45° angle $\theta$ results in polarization components of equal magnitude since the quarter-wave retardation plate 38 effectively functions as a half-wave retardation plate. When the incident light provided along the light path 24 passes through quarter-wave retardation plate 38 twice because of the mirror 40, the extraordinary component of the incident light along light path 24 goes through a phase change of 180° before it exits the quarter-wave retardation plate 38 so that the reflected and retarded light directed to the four-fold mirror 34 will have a 0° polarization component and a 90° polarization component of equal magnitude. It should also be noted that when the incident light along the light path 24 passes through a different one of the four windows 30, its vibration direction 46 strikes the fast axis 42 at a different angle $\theta$. However, the relative position of the vibration direction 46 of the incident light provided along the light path 24 with respect to the fast axis 42 is always an equivalent because of the equal circumferential spacing of the windows 30 on the cylindrical surface 29 of the shaft 28. Accordingly, the 0° polarization component and the 90° polarization component will have equivalent magnitudes independent of the window 30 through which the light directed along light path 24 enters.

After the incident has its polarization state changed, it is reflected by the same reflecting surface of the four-fold mirror 34 that the incident light along light path 24 passes through the same window 30 along the path 48 to the beam splitter 20. After being reflected by the beam splitter 20, the retarded light beam 50 strikes the polarizing beam splitter 54 which splits the retarded light beam 50 into a 90° polarization component beam along light path 56 and a 0° polarization component beam along light path 60. The 90° polarization component beam 56 is detected by a 90° polarization component detector 58, and, in a similar manner, the 0° polarization component beam 60 is detected by a 0° polarization component detector 62. The resulting signals are provided to and processed by a signal processor 64, the function of which is described more fully below.

When the shaft 28 is in its no-load, torsionally undeflected state, the signal processor 64 senses and stores the initial values of the 90° polarization component and the 0° polarization component for use in computing the torsional deflection using the corresponding values when the shaft 28 is in a loaded, torsionally deflected state. In addition, values for the 0° and 90° polarization components for all angles $\theta$ between the vibration direction 46 and the fast axis 42 are likewise determined to correlate sensed 0° and 90° polarization component values with the initial value to provide a torsional deflection signal. While rotation of the shaft 28 causes the linearly polarized light along the light path 24 to strike the quarter-wave retardation plate 38 four times per revolution, the vibration direction 46 of the incident light from light path 24 will strike the fast axis 42 at the same relative angle $\theta$ every time for any given torsional deflection.

When the shaft 28 is subjected to a torsional load, the forward and rearward ends will be rotationally displaced relative to one another to cause a corresponding relative rotation of the quarter-wave retardation plate 38, a change in the orientation of the fast axis 42, and a change in the angle $\theta$ between the fast axis 42 and the vibration direction 46. Because of these differences, the values of the 0° polarization component and the 90° polarization component of the retarded light returned toward the four-fold mirror 34 from the quarter-wave retardation plate 38 will also vary from the polarization component values under the no-load, torsionally undeflected conditions.

The retarded light is reflected by the four-fold mirror 34 to the light path 50 and presented to the beam splitter 20 and the polarization splitter 54 and split into a 0° polarization component along light path 56 and a 90° polarization component along light path 60. The polarization component along light paths 56 and 60 are then detected by the detectors 58 and 60, respectively, and the detected signals sent to the signal processor 64.

The signal processor 64 uses the signal values to calculate the result of the difference of these values divided by their sum, compare this result with the predetermined values for all angles $\theta$ to determine the detected angle $\theta$, and provide an output representative of the angular difference $\delta\theta$ between the detected angle $\theta$ and the angle $\theta$ sensed under the no-load, torsionally undeflected conditions. This angular difference, $\delta\theta$, is the torsional displacement between the front shaft end 32 and its rear shaft end 35. The rotational shaft speed is determined by counting the frequency of the pulses detected by either the detector 58 or the detector 60 per unit time.

As an alternative to calculating each of the values of the 0° polarization component and the 90° polarization component and storing these values in signal processor 64, Mueller calculus can be used to predict the torsional displacement for detected polarization component values. The optical power P of the detected signal follows the equation:

$$P = K[1 + \cos 4(wt + \delta\theta)]^2 \qquad \text{Eq. 1}$$

where
K is a scaling factor,
w is the shaft rotation rate,
$\theta$ is the torsional displacement, and
$\delta\theta$ is the change in torsional displacement.

Since the shaft speed w can be determined from the the pulses per unit time from the detectors 58 and 62 and the scaling factor K and the optical power P are known, the torsional displacement $\theta$ can be derived.

The embodiment of FIG. 1 uses a quarter-wave retardation plate 38 with a mirror 40 because the configuration allows very accurate measurements to be obtained. The calculation of the difference of the 90° polarization component and the 0° polarization component divided by the sum of these components compensates for fluctuations in the intensity of the light provided by the optical source 12 and provides accurate and repeatable results. If desired, the quarter-wave retardation plate 38 can be replaced with a different type of the retardation plate that varies the phase of the extraordinary ray of the incident light by a different amount. The magnitudes of the 0° polarization component and the 90° polarization component of the resulting retardation of the light under no-load conditions can still be predetermined for any angle $\theta$ for the retardation plate used. These values can then be compared to the values actually detected by the 0° polarization component detector 58 and the 90° polarization component detector 62 to determine the torsional angular displacement of the shaft 28, although the retarded light provided by the retardation plate may be linearly, elliptically, or circularly polarized. Also, the number of windows 30 provided in the shaft 28 is arbitrary, although a greater number of windows 30 increases the accuracy of the resulting measurement.

Figure 2:
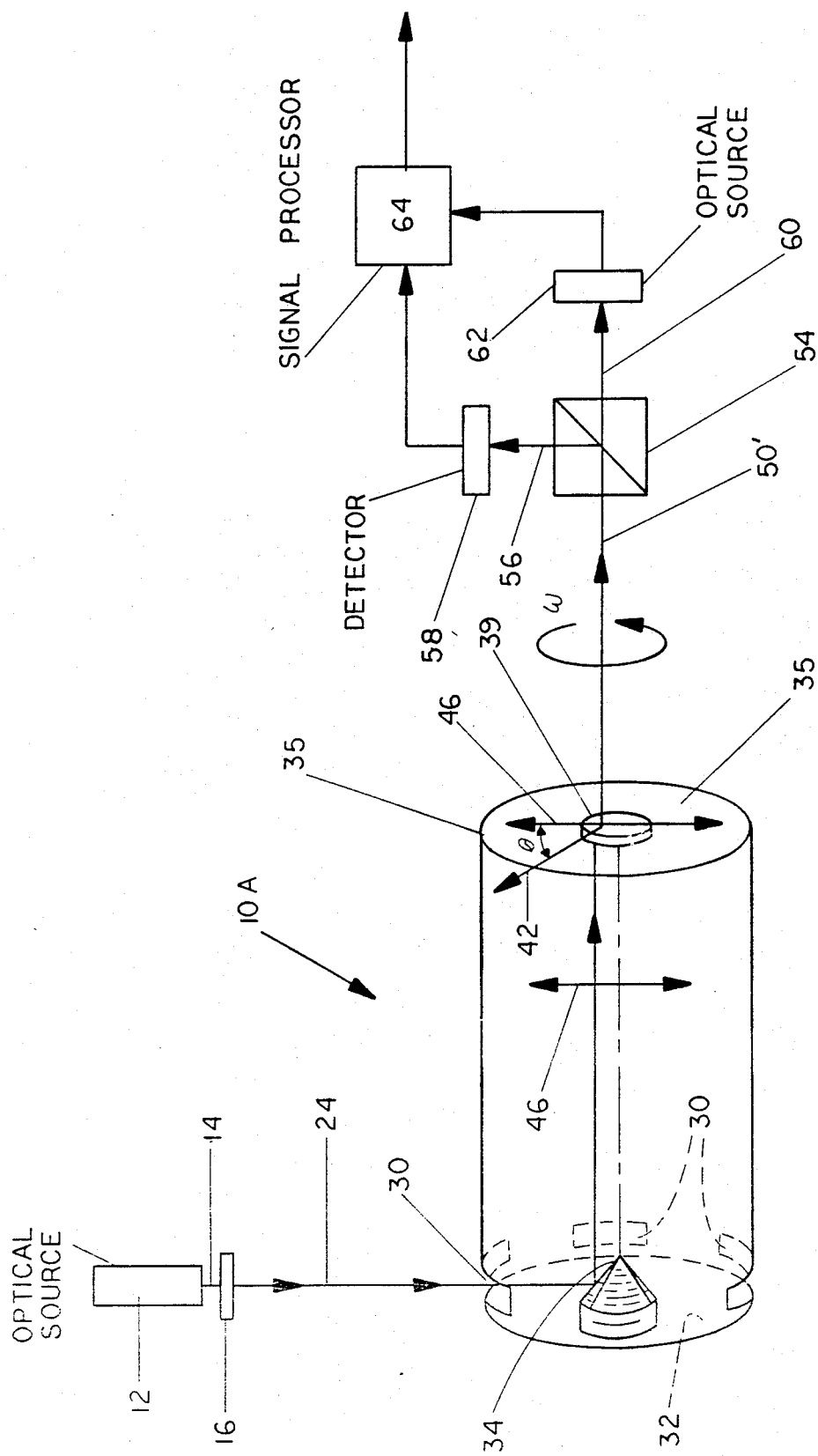
FIG. 2 illustrates a second embodiment of the system presented in FIG. 1.

A variation of the system of FIG. 1 is shown in FIG. 2 and designated therein by reference character 10A with like parts designated by like reference characters. A half-wave retardation plate 39 at the end wall 35 is utilized in a transmission configuration by which the light reflected from the four-fold mirror 34 is directed through the half-wave retardation plate 39 with the retarded light transmitted through the half-wave retardation plate 39 along a light path 50' to the polarization beam splitter 54 for analysis as described above. The end wall 35 is apertured (unnumbered) as appropriate to allow light passing through the half-wave retardation plate to pass along path 50'. As can be appreciated, the light transmitted through the half-wave retardation plate 39 includes the 0° polarization component and the 90° polarization component. After detection, the signal outputs of the detectors 58 and 62 are processed in the same way by the signal processor 64 to determine the speed of the shaft 28 and its torsional displacement.

Figure 3:
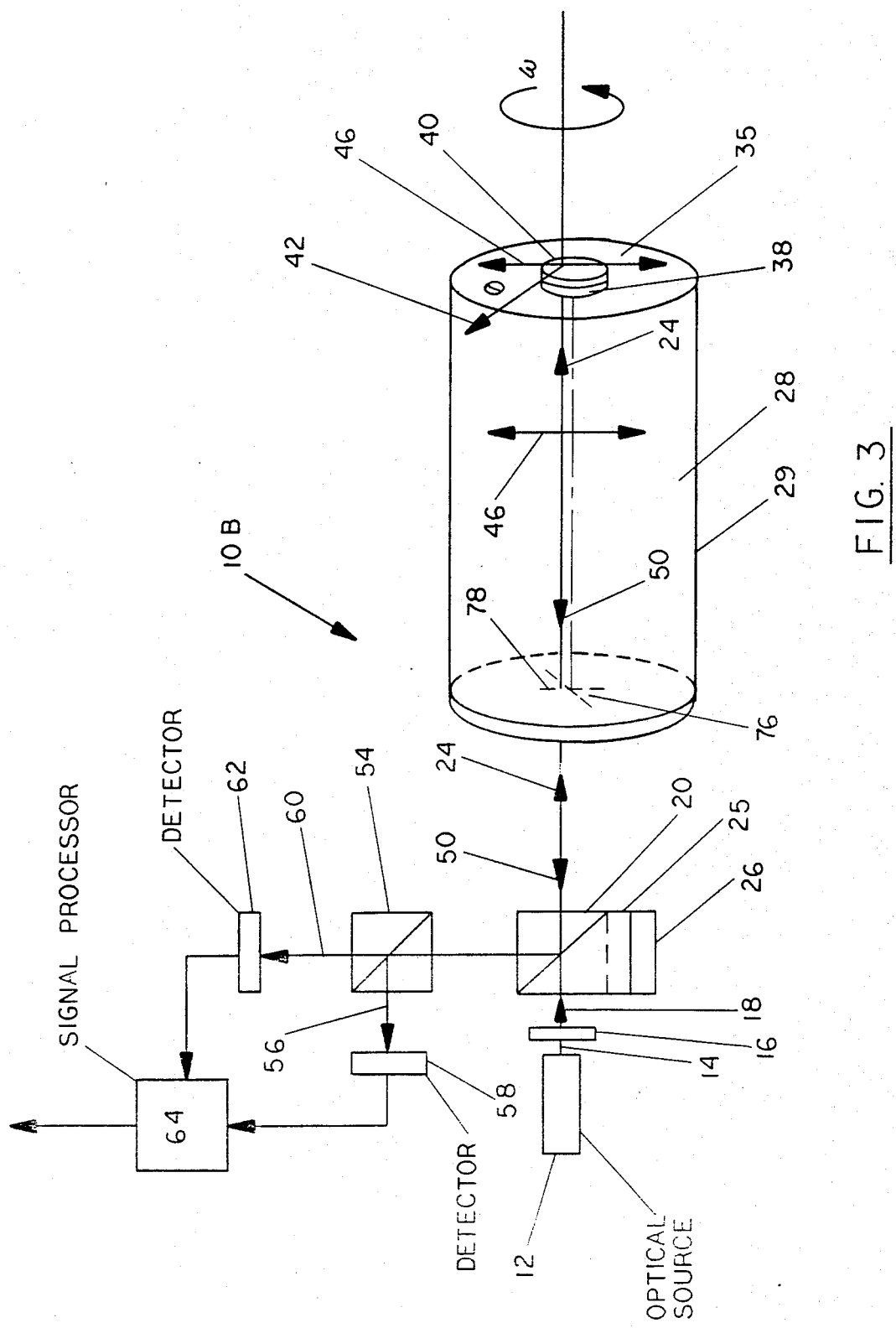
FIG. 3 illustrates a third embodiment of the present invention.

Another embodiment of the present invention is illustrated in FIG. 3 and is designated generally therein by the reference character 10B and in which like reference characters are used for like parts. In the embodiment of FIG. 3, the windows 30 and the four-fold mirror 34 are not utilized. As shown, the forward end wall 32 of the shaft 28 is provided with a slit system 76, including orthogonally crossed slits 78 (represented in dotted line). The slits 78 serve the same purpose as the equally spaced windows 30 of the embodiments of FIGS. 2 and 3 in allowing the incident light along the light path 24 to strike the quarter-wave retardation plate 38 at the same relative angle $\theta$. It is noted that the light path is parallel to but offset from the axis of rotation $A_x$ of the shaft 28.

Figure 4:
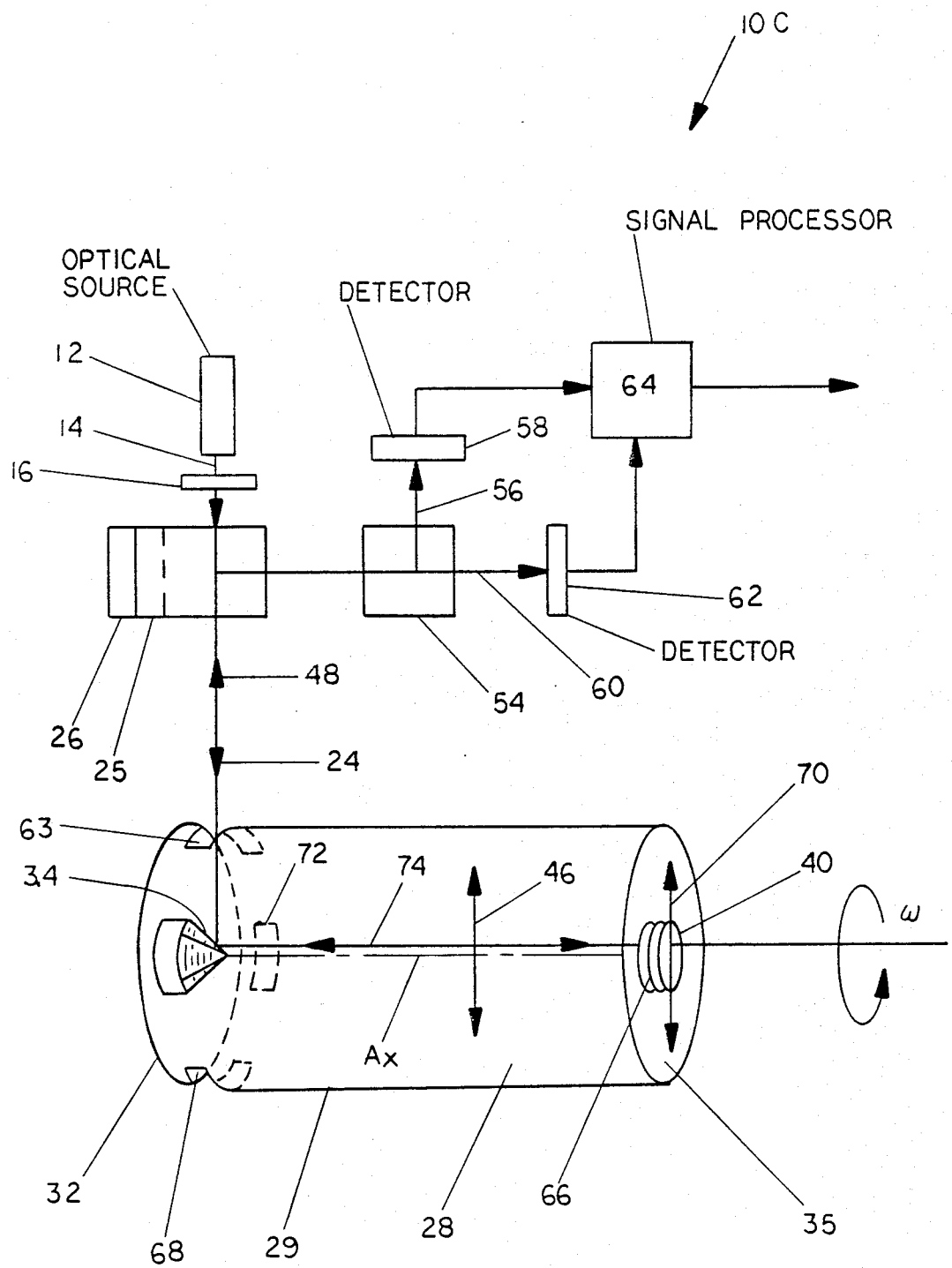
FIG. 4 illustrates a fourth embodiment of the present invention.

A further embodiment of the present invention is illustrated in FIG. 4 and designated by the reference character 10C. As shown, the shaft 28 includes a first set of diametrically opposed windows 68 and a second set of diametrically opposed windows 72 (of which only one is shown). A linear polarizer 66 and the mirror 40 are attached to the rear end wall 35 of the shaft 28 rather than the quarter-wave retardation plate 38 and mirror 40 of FIG. 1. The linear polarizer 66 is mounted on the rear shaft end 35 so that when the incident light along light path 24 travels through either of the two windows 68, the vibration direction 46 of the incident light is parallel to the transmission axis 70 of the linear polarizer 66. However, when the shaft 28 is rotated 90° and the incident light passes through the windows 72, the vibration direction 46 is perpendicular to the transmission axis 70. When the shaft 28 is torsionally unloaded, the resulting light along light path 74 will have its largest magnitude when the incident light along light path 24 travels through the windows 68 and will have a minimum magnitude, when the incident light from light path 24 travels through the windows 72. Measuring the magnitude of the resulting light along path 74 for all angles $\theta$ between the transmission axis 70 and the vibration direction 46 allows for the determination of the torque load on the shaft 28 since the torsional displacement causes a different detected magnitude of the light intensity.

Figure 5:
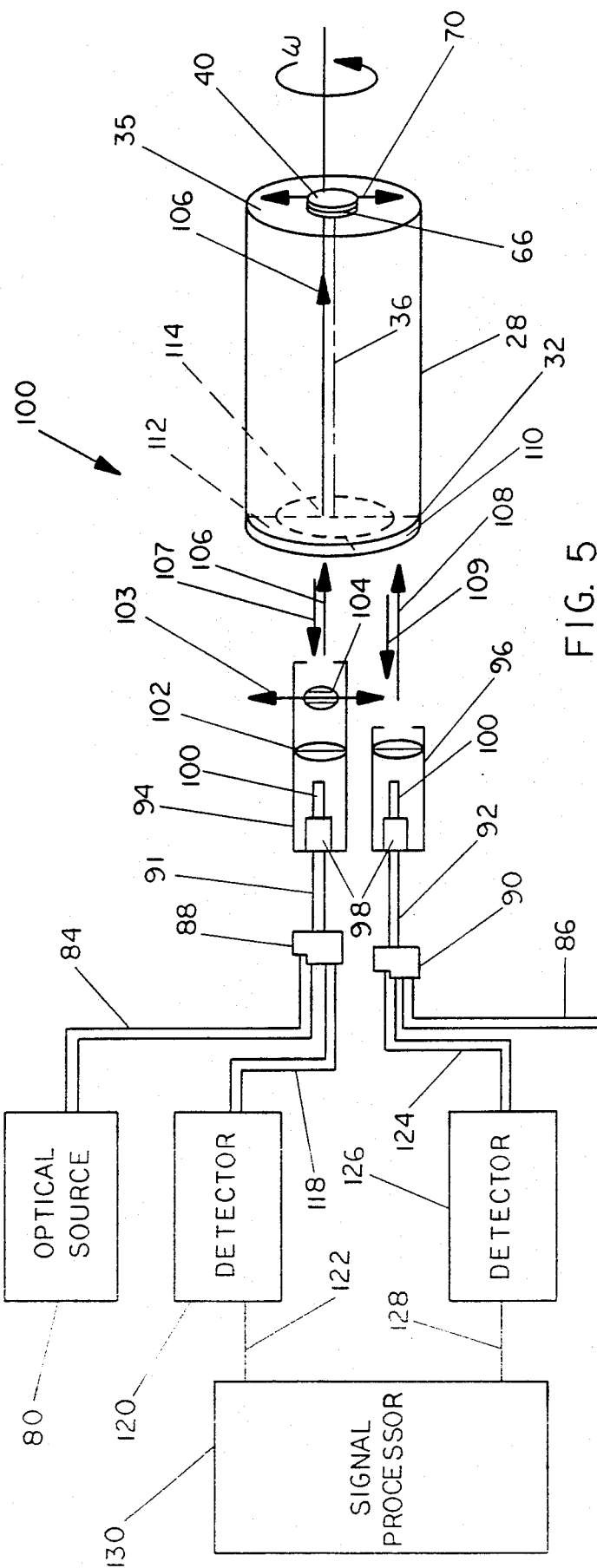
FIG. 5 illustrates a fifth embodiment of the present invention.
Figure 5A:
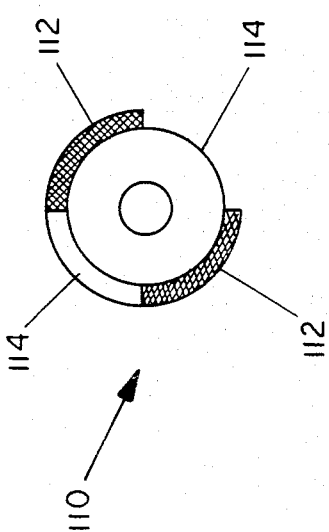
FIG. 5A is a front end view of a shaft presented in FIG. 5.
Figure 6:
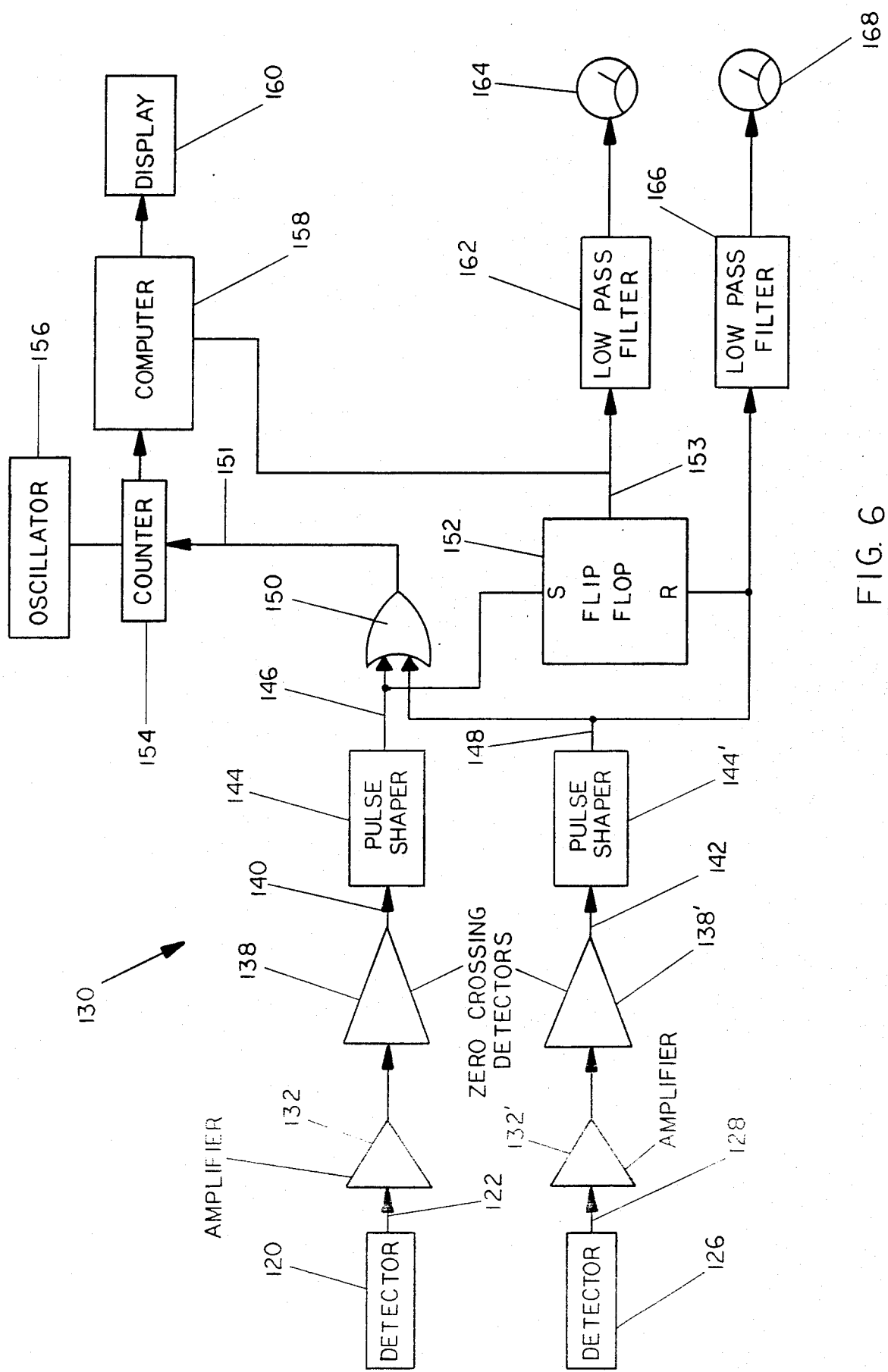
FIG. 6 illustrates a block diagram of the circuitry used to detect the torsional displacement and speed of the rotating shaft in the third embodiment of the present invention.

Another embodiment of the present invention is illustrated in FIGS. 5 and 6 and is designated generally by the reference character 10D with like parts designated by like reference characters. In the embodiment of FIG. 5, optical sensor heads, described below, direct light into and receive light from the shaft 28. In addition, the shaft 28 is provided with a linear polarizer 66 and underlying mirror 40 on the rear end wall 35 with the forward end wall of the shaft 28 defined, as shown in FIG. 5A, by a light chopper 110 in the form of an annular rim having diametrically opposed non-reflective, i.e., light-absorbing, sectors alternated with reflective sectors 114.

As shown, a light source 80 generates and introduces light into the core of an optical fiber 84 and, in a similar manner, a light source 82 generates and introduces light into the core of the optical fiber 86. The optical sources 80 and 82 can take the form of light emitting or laser diodes. The light from the optical fibers 84 and 86 is transferred to passive, bi-directional optical couplers 88 and 90, respectively, which provide a 50/50 split ratio. The couplers 88 and 90 each have three ports arranged so that 50% of the incoming light introduced through one port is transmitted to each of the remaining two ports. A portion of the light generated from the light source 80 passes through the coupler 88 into the optical fiber 91 and travels to a sensor head 94, and, in a similar manner, a portion of the light from the light source 82 passes through the coupler 90 to the optical fiber 92 to the sensor head 96.

Both sensor heads 94 and 96 are similar and include a bulkhead connection 98, an optical fiber stub 100, and a lens 102. Each lens 102 is designed with a focal length that focuses the return light back into its respective optical fiber stub 100. The sensor head 94 also contains a linear polarizer 104 having a center bandwidth that matches the center bandwidth of the light emitted from the light source 80. In addition, the diameter of the polarizer 104 matches the diameter of the lens 102 in the sensor head 94.

The polarized light emitted from the polarizer 104 is transmitted along light path 106 and passes through the interior of the shaft 28 in a direction parallel to the longitudinal axis $A_x$ of shaft 28. The polarized light irradiates and passes through the polarizer 66 and is returned along light path 107 by the mirror 40 as twice-polarized light that passes through the polarizer 104, is focused by the lens 102 into the optical fiber stub 100, and passes through the bulkhead connection 98 and the optical fiber 91 into the coupler 88. A portion of the twice-polarized return light then travels through the optical fiber 118 and is detected by the detector 120 which provides an output along circuit path 122 to the signal processor 130.

The sensor head 96 directs light along light path 108 toward the forward end of the shaft 28 (FIG. 5A) and irradiates the two non-reflective areas 112 and the two alternating reflective areas 114, the non-reflective and reflective sectors subtending the same arc. When the light from the sensor head 96 along light path 108 irradiates the reflective areas 114, a portion is reflected back along light path 109 toward the sensor head 96, is focused by the lens 102 into the optical fiber stub 100, and then passes through the bulkhead connection 98 and the optical fiber 92 into the coupler 90. A portion of the reflected light passes through the optical fiber 124 and is detected by the detector 126 which provides an output along circuit path 128 to the signal processor 130.

The detectors 120 and 126 convert the detected optical signals from the twice-polarized return light along light path 107 and the reflected light along light path 109 into electrical signals along circuit paths 122 and 128, respectively. Both of the electrical signals along circuit paths 122 and 128 are sent to the signal processor 130 so that the shaft speed and torsional displacement of shaft 28 can be determined, as explained below in relationship to FIG. 6.

The polarizer 66 is mounted on the rear end wall 35 of the shaft 28 so that its transmission axis 70 is aligned with the transition between the reflective areas 114 and the non-reflective areas 112. This orientation allows for the detection of the twice-polarized light returned along light path 107 during those times that light along light path 108 is being absorbed by the non-reflective area 112 of the chopper 110. When light is reflected along light path 109 by the reflective area 114 and is detected, the transmission axis 103 of the polarizer 104 is perpendicular to the transmission axis 70 of the polarizer 66. Accordingly, the twice-polarized light returned along light path 107, having a magnitude of zero, is extinguished to result in two pulses per revolution per channel occurring at equally spaced intervals when the shaft 28 is rotating at a constant speed.

The speed of rotation of the forward portion of the shaft 28 can be determined by measuring the time between the pulses sensed by the detector 126. Similarly, the speed of rotation of the rearward portion of the shaft 28 can be determined using the time between pulses detected by the detector 120. The torsional displacement of the forward portion of the shaft 28 with respect to the rearward portion can be determined by detecting the time difference between the pulses detected by the detector 120 and the detector 126. Dividing the time between these pulses by the period of rotation and then multiplying by a scaling factor yields the torsional displacement of the front and rear portions of the shaft 28.

The signal processor 130 is shown in functional block diagram form in FIG. 6, and, as shown, the electrical signals provided on the circuit paths 122 and 128, which correspond to the signals detected by the detectors 120 and 126, respectively, are each sent through respective amplifiers 132 and 132' into respective zero-crossing detectors 138 and 138'. The zero-crossing detectors 138 and 138' transform the analog signals along circuit paths 134 and 136 into digital signals along circuit paths 140 and 142 that are sent to respective pulse shapers 144 and 144'. Each pulse shaper 144 and 144' produces a short pulse on the rising or leading edge of the respective digital signal from the zero-crossing detectors 138 and 138'. Each pulse shaper 144 and 144' outputs a pulse with a fixed duration sufficiently short so that a pulse on circuit path 146, obtained from the digital signal on circuit path 140, does not overlap a pulse on circuit path 148, obtained from the digital signal on the circuit path 142. The pulse shapers 144 and 144' can be designed, if desired, to provide a pulse on both the rising and falling edges of the digital signals on the circuit paths 140 and 142 to double the number of measurements that can be obtained in a single revolution of the shaft 28. The pulse output on the circuit path 146 is sent to one input of an OR gate 150 and the set input of a RS flip-flop 152. The pulse on circuit 148 path is sent to another input of the OR gate 150 and the reset input of the RS flip-flop 152.

Whenever the OR gate 150 detects an input pulse, an output pulse is provided along circuit path 151 to a counter 154, which receives its timing signals from an oscillator 156, and determines the time that the pulse was sent by the OR gate 150. A computer 158 reads and stores this time, determines the time duration between successive pulses, and uses these times to compute the shaft speed with the torsional displacement of the shaft 28 presented on a display 160.

If a distinction between the speed of the forward end of the shaft 28 and rearward end is desired, the output waveform along circuit path 153 from the RS flip-flop 152 can be sent to the computer 158 to indicate whether the computer 158 is reading a pulse originating from the detector 120 or from the detector 126. Furthermore, overspeed and underspeed conditions of the shaft 28 can be determined by comparing the detected shaft speed with predefined upper and lower shaft speed limits.

FIG. 6 also includes the analog equivalent of the calculation circuitry which normally is not included with the digital equivalent described above. The analog circuitry requires the use of the R-S flip-flop 152 and low-pass filters 162 and 166. Pulses along circuit paths 146 and 148, which are provided to the set and reset inputs of the R-S flip-flop 152, generate an output waveform along circuit path 153 that is proportional to any phase changes between the pulses along circuit paths 146 and 148. The output waveform along circuit path 153 is then sent to the low-pass filter 162 to convert the phase information of the output waveform along circuit path 153 into an appropriate voltage which is sent to a torsional displacement indicator 164 to display the torsional displacement. The pulse output along circuit path 148 is also sent to a low-pass filter 166 to produce a voltage which is provided along a circuit path to a speed indicator 168 to display the rotational speed w of the shaft 28. The signal processor 130 can also derive the torsional displacement using Mueller calculus rather than storing the magnitude of each detected signal for different angles $\theta$. The optical power P of the detected signal follows the equation:

$$P = K[1 + \sin 2(wt + \delta\theta)]^2 \qquad \text{Eq. 2}$$

when
P is the optical power,
K is a scaling factor,
w is the shaft rotation rate,
$\theta$ is the torsional displacement, and
$\delta\theta$ is the change in torsional displacement.

The signal processor 130 can solve this equation to determine the torsional displacement $\delta\theta$. A modification of this embodiment places either a polarizer 66 or a retardation plate at both the forward end of the shaft 28 and the rearward end. The pulses are obtained in the same way and the difference between the time of pulses is determined using similar types of detectors.

Figure 7:
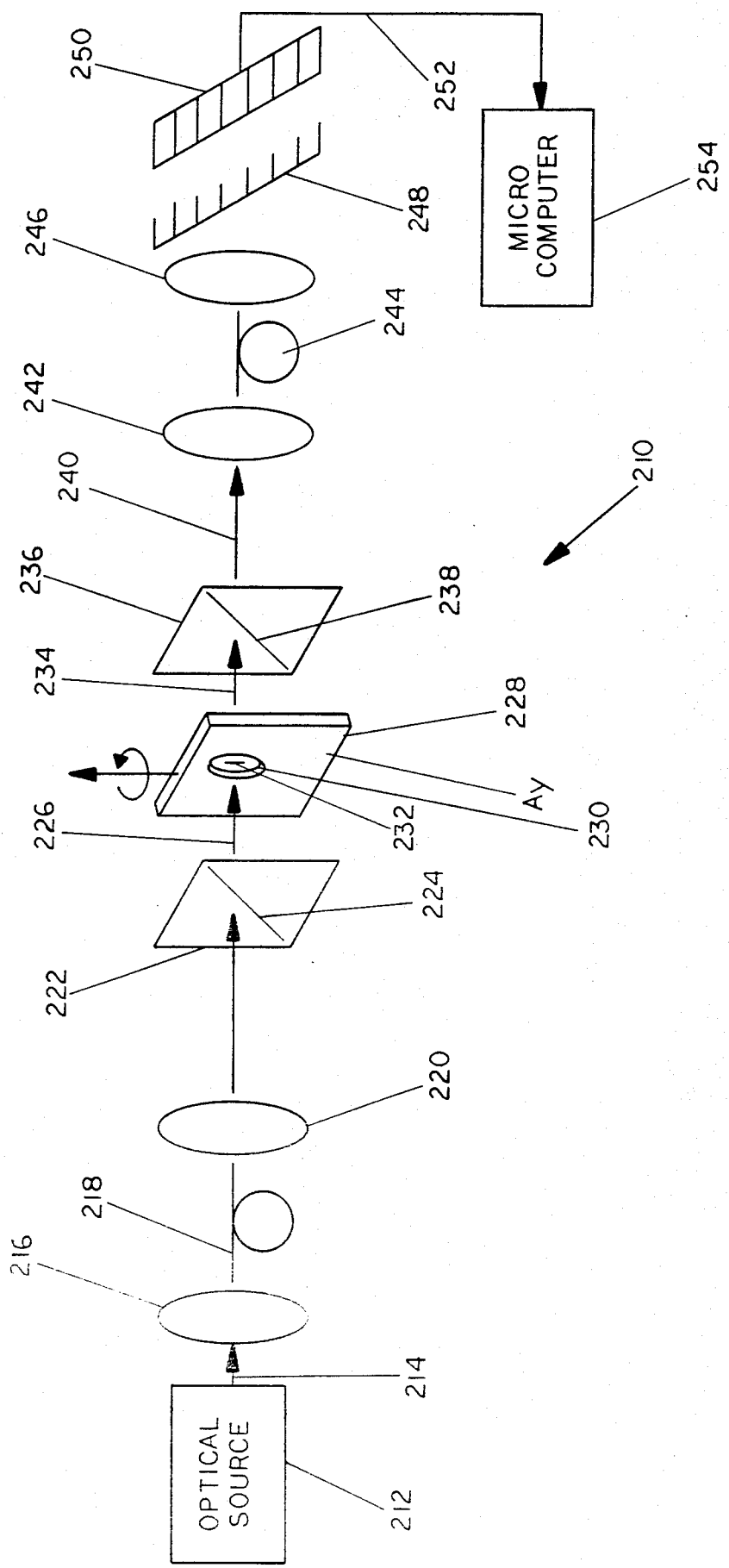
FIG. 7 illustrates a sixth embodiment of the present invention.

Another embodiment of the present invention suitable for angular position and displacement sensing of a rotatably mounted member is illustrated in FIG. 7 and is designated generally therein as reference character 210. The system 210 is designed to measure the angular displacement of an article, such as an engine throttle plate that is rotatably mounted. The article 228 is rotatable about an axis $A_y$ at some rotation angle $\theta$ from its initial position. A retardation plate 230 is mounted upon the article 228 and has its fast axis, represented at 232, parallel to axis $A_y$. As can be appreciated, suitable apertures (unnumbered) or other openings are provided on the article upon with the retardation plate 236 is mounted to allow transmission of light through the retardation plate 230 and the article 228 upon which it is mounted. Polarizers 222 and 236 are mounted on opposite side of the retardation plate 230 and article 228 and have their transmission axes, represented at 224 and 238, respectively, fixed at 45° to the fast axis 232 of the retardation plate 230.

An optical source 212, such as a light emitting diode, emits broadband light that travels along a path 214, is focused by a lens 216 into one end of an optical fiber 218, emitted from the output end of the optical fiber 218, and focused by a lens 220 onto the polarizer 222 to result in a polarized light beam traveling along path 226. The polarized light beam 226 is transmitted through the retardation plate 230 and is emitted therefrom as a retarded light beam traveling along path 234. The retarded light beam then strikes the polarizer 236 so that the only a portion of the retarded light beam that passes through the polarizer 236 is parallel to the polarized incident light beam traveling along the path 226 that originally struck the retardation plate 230.

The resulting retarded and twice polarized light beam travels along path 240, is focused by lens 242 into one end of an optical fiber 244, emitted from the other end of the optical fiber 244, and focused by lens 246 on a transmission diffraction grating 248. The intensity of each wavelength of the diffracted light is detected by a charge-coupled device 250 and transformed into electrical signals that are output along circuit path 252 to a microcomputer 254 and then processed to determine the rotation angle $\theta$ of retardation plate 230, and, therefore, the rotation angle $\theta$ of the article 228.

The position of the polarizers 222 and 236 with respect to the retardation plate 230, the retardation value of the retardation plate 230, and the various wavelengths of light emitted from broadband light emitting diode 212 all combine to allow the determination of the rotation angle $\theta$.

For a retardation plate 230 that has a retardation value R, expressed nanometers (nm), rotation of the retardation plate 230 causes the retardation value R to change according to the equation:

$$R\theta = R_0/(\cos \theta) \qquad \text{Eq. 3}$$

where: $R_0$ is the retardation value for $\theta = 0$.

Equation 3 indicates that the path length of the polarized light incident on and through the retardation plate 230 increases as the value of $\theta$ increases. Since the retardation value R and the rotation angle $\theta$ are associated, the effect that the retardation value has on varying wavelengths can be used to determine the rotation angle $\theta$. The light intensity of the retarded and twice polarized incident light beam that is emitted from polarizer 236 is given by:

$$I(W) = (IO(W)/4)(1 + \cos(2\pi R\theta/W)) \qquad \text{Eq. 4}$$

where:
$R\theta$ is the retardation value (nm),
W is the wavelength in (nm), and
$\theta$ is the rotation angle.

As used in the present invention, the retardation value $R_0$ is chosen so that it is a multiple of $2\pi$ plus one-half wavelength for some wavelength $W_o$ transmitted by broadband light source 212. For that wavelength $W_o$, the light intensity will be at a minimum when the rotation angle $\theta$ is 0°. This agrees with Eq. 4 because R $\theta/W$ will then be one-half and the term $\cos(2\pi R\theta/W)$ will be zero. When retardation plate 230 is rotated by some rotation angle $\theta$, the retardation value $R\theta$ will then change according to the Eq. 3 and the wavelength having a minimum intensity will also change. Therefore, it can be seen that a change in a rotation angle $\theta$ will cause a change in the wavelength having a minimum intensity. Detecting the wavelength of minimum intensity therefore allows the rotation angle can be determined.

For the above described system, the rotation angle $\theta$ is:

$$\theta = \cos^{-1}(W_o/W_{min}) \qquad \text{Eq. 5}$$

where $W_o$ is the wavelength having minimum intensity at $\theta = 0°$, and $W_{min}$ is the wavelength detected that has minimum intensity.

Using equation 5, the microcomputer 254 determines the rotation angle $\theta$ once the wavelength of minimum intensity is detected.

Figure 8:
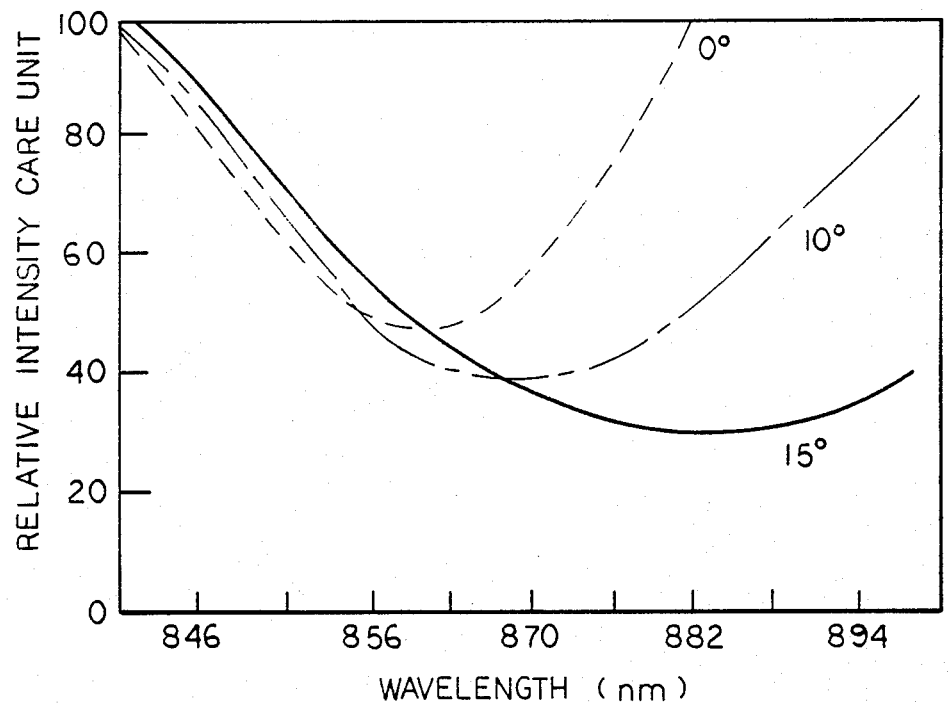
FIG. 8 illustrate the output signal obtained from the sixth embodiment of the present invention.

FIG. 8 shows a graph of the wavelength of minimum intensity for one specific set of element types and was generated using a broadband LED having a center wavelength of 867 nm, a FWHM of 30 nm, and an output power of 6 mW for the optical source 212. Each lens 216, 220, 240, and 246 was a Melles Griot f/0.8 lens, and the optical fibers 218 and 244 were 200/240 micron optical fibers. The retardation plate 230 was assembled from a stack of plastic POLAROID waveplates having an on-axis retardation of 2070 nm. The transmission diffraction grating 248 used had a 1200 lines per millimeter line density and was blazed for 600 nm. The charge-coupled device array 250 was a Reticon RL512 linear detector array having 512 elements and a 25.4 μm spacing. The retardation plate 230 was then rotated through various angles $\theta$ and the wavelength of minimum intensity increase as the rotation angle $\theta$ increases.

As will be apparent to those skilled in the art, various changes and modifications may be made to the illustrated optical shaft angular and torsional displacement and speed sensing system of the present invention without departing from the spirit and scope of the invention as determined in the appended claims and their legal equivalent.

What is claimed is:

1. An apparatus for determining the displacement of a hollow rotatable shaft comprising:
   polarization means disposed on a rotatably mounted hollow shaft for changing the polarization state of light energy; said polarization means comprising a retardation plate, said plate being disposed on an end of the shaft;
   light producing means adapted to produce polarized light energy and direct the light energy toward said plate;
   said detector means being adapted to detect the change in the polarization state of the light energy from said polarization means; and
   means for determining the torsional displacement of said shaft from the detected change in polarization state of the light energy.

2. An apparatus according to claim 1 wherein said second-mentioned means comprises:
   means for directing the light energy perpendicular to the longitudinal axis of the shaft at a forward end of the shaft, the shaft having a plurality of equally spaced windows in a surface thereof; and
   means for reflecting disposed on the forward end of the shaft for reflecting the light energy toward said rearward shaft end along the longitudinal axis of the shaft.

3. An apparatus according to claim 2 wherein the light energy directing means further comprises a mirror disposed between said retardation plate and said rear shaft end.

4. An apparatus according to claim 1 wherein said retardation plate is a half-wave retardation plate.

5. An apparatus according to claim 1 wherein retardation plate is a quarter-wave retardation plate.

6. An apparatus according to claim 1 wherein said means for determining said torsional displacement uses Mueller calculus to determine said torsional displacement.

7. An apparatus for determining the displacement of a rotatable throttle comprising:
   polarization means disposed on a rotatable throttle for changing the polarization state of light energy; said polarization means comprising a retardation plate having a fast axis, said plate being disposed on said throttle so that rotation of said throttle causes rotation of said retardation plate about said fast axis;
   light producing means adapted to produce polarized light energy and direct the light energy toward said polarization means;
   detector means adapted to detect the change in the polarization state of the light energy from said polarization means, said detector including a polarizer; and
   means for determining the displacement of the throttle from the detected change in polarization state of the light energy.

8. An apparatus according to claim 7 wherein said retardation plate has a retardation value of $2\pi n$ plus one-half wavelength for some wavelength of light produced by said polarized light energy producing means when n is an integer.

9. An apparatus according to claim 8 wherein:
   said second mentioned means produces polarized light energy that is linearly polarized and strikes said retardation plate at 45° to said fast axis of said retardation plate; and
   said polarizer included in said third mentioned means has a transmission axis aligned at 45° to said fast axis of said retardation plate.

10. An apparatus according to claim 7 wherein said means for determining displacement includes;
    a transmission diffraction grating; and
    a charge coupled device array.

11. An apparatus for determining the torsional displacement of a hollow rotating shaft comprising;
    light producing means for producing light energy having a predetermined intensity;
    light directing means for directing the light energy toward the hollow shaft;
    a polarizer disposed on said shaft for changing the polarization state of the light energy, said polarizer being disposed on the rearward end of said shaft, said light directing means being adapted to direct the light energy toward said polarizer;
    detector means for detecting said changed polarization state of the light energy intensity; and
    means for determing the shaft torsional displacement from a detected changed light energy intensity consequent to a change in the polarization state thereof.

12. An apparatus according to claim 11 wherein the produced light energy is polarized.

13. An apparatus for determining torsional displacement of a rotating shaft comprising:
    a rotatable hollow shaft having a forward end and a rearward end;

means for producing light energy and irradiating said front end;

means for producing polarized light energy and irradiating said rearward end;

chopper means disposed on said front end for alternately reflecting and absorbing said produced light energy;

means disposed on said rearward end for changing the optical characteristic of said polarized light;

means for detecting the light energy is reflected by said chopper means;

means for detecting the changed optical characteristic of the polarized light;

means for determining the shaft torsional displacement using the detected changes and reflections.

14. An apparatus according to claim 13 further comprising a mirror disposed between said polarizer and said rearward end.

15. An apparatus according to claim 13 wherein said means for detecting said reflected light energy and said means for detecting the changed polarized light energy each effect said detections alternately.

16. An apparatus according to claim 13 wherein said changed optical characteristic of said polarized light energy is the polarization.

17. An apparatus according to claim 13 wherein said changed optical characteristic of said polarized light energy is the light intensity.

* * * * *

UNITED STATES PATENT AND TRADEMARK OFFICE
CERTIFICATE OF CORRECTION

PATENT NO. : 4,874,245

DATED : OCTOBER 17, 1989

INVENTOR(S) : ELLINGER, KLINE, PATRIQUIN, RUDD & SPILLMAN

It is certified that error appears in the above-identified patent and that said Letters Patent is hereby corrected as shown below:

Column 1, Line 58

"determine" should read --determined--

Column 4, Line 21

"illustrate" should read --illustrates--

Column 7, Line 35

"the the pulses" should read --the pulses--.

Signed and Sealed this

Twenty-sixth Day of February, 1991

Attest:

HARRY F. MANBECK, JR.

Attesting Officer

Commissioner of Patents and Trademarks